United States Patent
Hörnkvist et al.

(10) Patent No.: US 8,271,445 B2
(45) Date of Patent: Sep. 18, 2012

(54) STORAGE, ORGANIZATION AND SEARCHING OF DATA STORED ON A STORAGE MEDIUM

(75) Inventors: John Hörnkvist, Cupertino, CA (US); Yan Arrouye, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 254 days.

(21) Appl. No.: 11/760,511

(22) Filed: Jun. 8, 2007

(65) Prior Publication Data

US 2008/0307016 A1    Dec. 11, 2008

(51) Int. Cl.
*G06F 17/30* (2006.01)
(52) U.S. Cl. .............. 707/649; 707/695; 707/758
(58) Field of Classification Search .......... None
See application file for complete search history.

(56) References Cited

U.S. PATENT DOCUMENTS

| | | | |
|---|---|---|---|
| 5,495,607 A * | 2/1996 | Pisello et al. | 707/797 |
| 7,529,778 B1 * | 5/2009 | Dewey et al. | 1/1 |
| 2003/0167380 A1 * | 9/2003 | Green et al. | 711/136 |
| 2004/0088274 A1 * | 5/2004 | Xu et al. | 707/1 |
| 2004/0254936 A1 * | 12/2004 | Mohamed | 707/10 |
| 2005/0022122 A1 * | 1/2005 | Barrus et al. | 715/530 |
| 2007/0239949 A1 * | 10/2007 | Childs et al. | 711/162 |
| 2007/0271303 A1 * | 11/2007 | Menendez et al. | 707/200 |

* cited by examiner

Primary Examiner — Syed H Hasan
(74) Attorney, Agent, or Firm — Blakely, Sokoloff, Taylor & Zafman LLP

(57) ABSTRACT

Methods and apparatuses for storing, organizing and searching files stored in a storage device. Backup files may be stored in snapshot-dependent and/or snapshot-independent paths. The backup files may be stored with additional attributes that can be used for searching and/or indexing purposes.

29 Claims, 7 Drawing Sheets

STORAGE, ORGANIZATION AND SEARCHING OF DATA STORED ON A STORAGE MEDIUM

TECHNICAL FIELD

Embodiments of the invention relate to computing devices. More particularly, embodiments of the invention relate to techniques and devices that may be used to make backup copies of data that may be stored and searched efficiently.

BACKGROUND

Because situations may arise where a user of a computing device may wish to recover lost files, many backup techniques have been developed. These techniques include, for example, making complete copies of all files on a hard drive. The copies may be stored on disk or on tape and used to access lost files.

While this technique provides complete and reliable access to deleted files, recovery time may be longer than desirable and storage requirements may be relatively great. Thus, current solutions are not as efficient as may be desired.

SUMMARY

Methods and apparatuses for searching and restoring backed up files are disclosed. In one embodiment, snapshot/backup files are stored. The snapshot files have a corresponding path name to indicate a characteristic of the snapshot (e.g., date, time). A snapshot-independent path name is created for at least a subset of the snapshot files.

The snapshot files are indexed as indicated by the snapshot-independent path names. Attributes are associated with the snapshot files indicated by the snapshot-independent path names to indicate one or more of a date the corresponding file was created and a date the corresponding file was last modified. Search results are generated from a search within the snapshot files utilizing the snapshot-independent path names and the attributes associated with the snapshot files.

In one embodiment, the snapshot files include a copy of all files that have changed or have been created since a previous snapshot. In one embodiment, the original files are stored on a first storage medium and the snapshots of the files are stored on a second storage medium.

In one embodiment, creating a snapshot-independent path name for at least a subset of the snapshot files includes the following. Determining one or more portions of a path name for a file that correspond to the characteristic. Generating a new path name for the file without the one or more portions of the path name that correspond to the characteristic. Storing the file using the new path name. In one embodiment, the new path name includes at least a portion of a corresponding path name for a corresponding file stored on a first storage medium.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Described herein are techniques that may be used to backup files stored on a computing system and to restore deleted files. In one embodiment, "snapshots" are periodically (e.g., daily, weekly, hourly) created. The snapshots generally include a copy of one or more data files included in one or more paths on a selected storage device. In one embodiment, a snapshot includes only those files that have been modified since a previous snapshot. For example, a snapshot of a home directory for a user (e.g., Computer/Data/User/John) may include a copy of all data files that have been modified or created since the previous snapshot.

In one embodiment, snapshots are stored in new hierarchies of files and/or folders. That is, each snapshot may have a unique path name. In one embodiment, in order to conserve disk space, files and folders that have not changed are hard-linked. When indexing the snapshots, a hard-linked file or folder in multiple snapshots is considered a single file or folder and indexed only once. In one embodiment, the snapshots may be stored on a different storage device than where the original data files are stored.

Described herein are techniques to store, search and present snapshots that may be used to restore files and folders. Multiple search scenarios are supported by the techniques described herein. For example, a search may be performed within a selected snapshot. As another example, a search may be performed in which the snapshot for which a file or folder changes may be performed.

Figure 1:
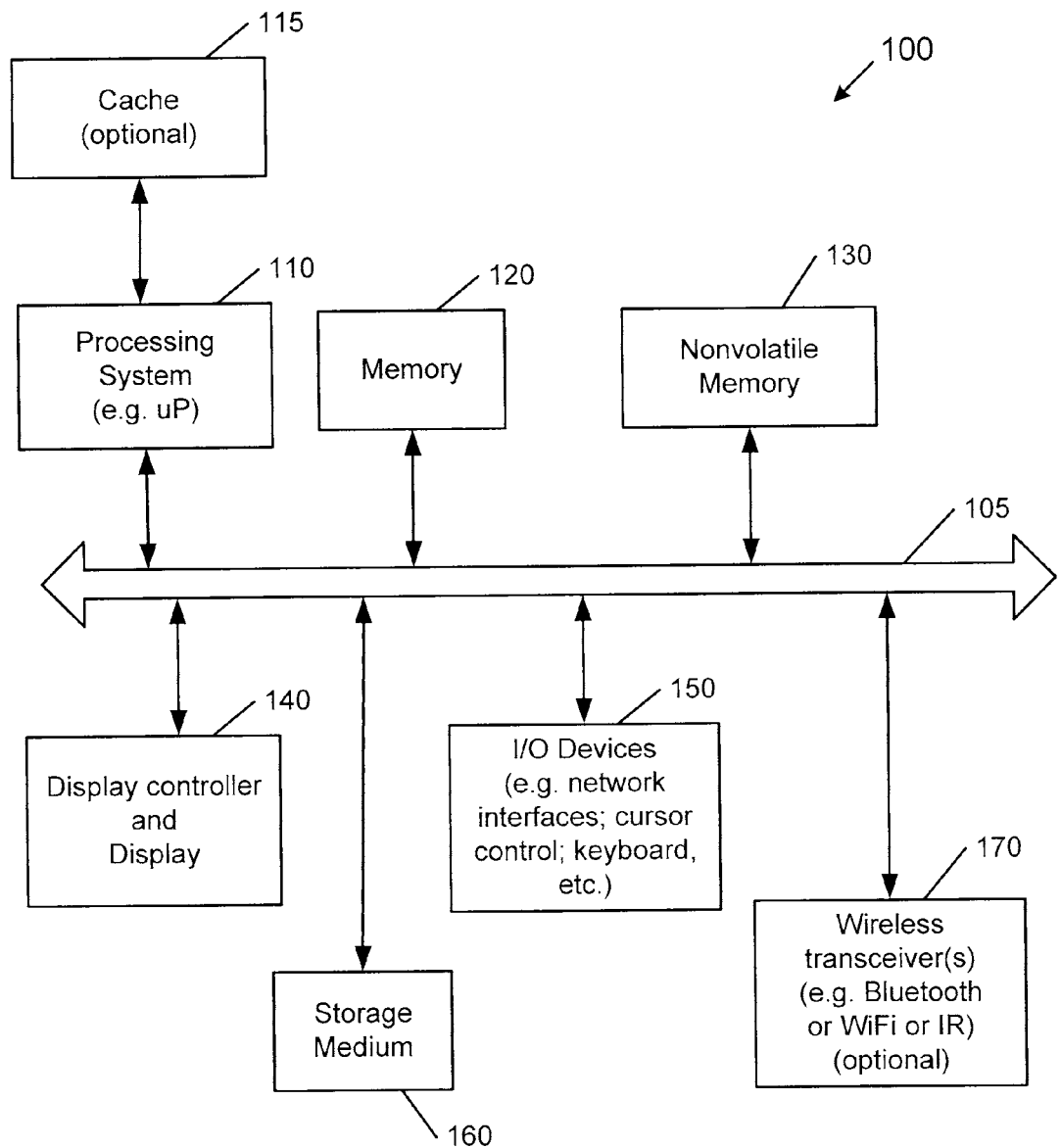
FIG. 1 is a block diagram of one embodiment of a computing system.

FIG. 1 is a block diagram of one embodiment of a computing system. While FIG. 1 illustrates various components of a computing system, it is not intended to represent any particular architecture or manner of interconnecting the components as such details are not germane to the present inventions. Personal digital assistants (PDAs), cellular telephones, media players (e.g. an iPod®), devices which combine aspects or functions of these devices (a media player combined with a PDA and a cellular telephone in one device), network computers, an embedded processing device within another device, and other data processing systems which have fewer components or perhaps more components may also be used to implement the techniques described herein and may be one or more of the data processing systems described herein. The computing system shown in FIG. 1 may, for example, be a Macintosh computer from Apple Inc. or a computer that runs the Windows® operating software from Microsoft Corporation.

Computing system 100 includes bus 105, which is coupled to one or more microprocessors to form processing system 110. Bus 105 is also coupled to memory 120 and to a non-volatile memory 130, which may be a magnetic hard drive in certain embodiments, or flash memory in other embodiments. Bus 105 is also coupled to display controller and display 140 and one or more input/output (I/O) devices 150.

Further, bus 105 may be coupled to storage medium 260, a hard disk drive or other device where data may be stored. In one embodiment, "snapshots" of files stored on a primary storage device (e.g., hard disk) may be stored on a secondary storage device (e.g., another hard disk). Storage medium 260 may be used to store snapshots and/or other data. In alternate embodiments, snapshots may be stored by other devices including, for example, the device on which the original file is stored.

Processing system 110 may optionally be coupled to cache 115. Processing system 110 may include one or more microprocessors, such as a microprocessor from Intel or IBM. Bus 105 interconnects these various components together in a manner which is known in the art. Typically, the input/output devices 150 are coupled to the system through input/output controllers.

Memory 120 may be implemented as dynamic RAM (DRAM) which provides fast access to data but requires power continually in order to refresh or maintain the data in memory 120. Non-volatile memory 130 may be a magnetic hard drive or other non-volatile memory which retains data even after power is removed from the system. While FIG. 1 shows that non-volatile memory 130 is a local device coupled directly to the rest of the components in the data processing system, it will be appreciated that other embodiments may utilize a non-volatile memory which is remote from a system, such as a network storage device, which is coupled to the data processing system through a network interface, such as a modem or an Ethernet interface.

Bus 105 may include one or more buses interconnected through various bridges, controllers, and/or adapters. In one embodiment, I/O controller 150 may include a USB compliant adapter for controlling USB compliant peripherals and an IEEE-1394 controller for IEEE-1394 compliant peripherals. Many other peripheral devices may also be supported.

Aspects of the inventions described herein may be embodied, at least in part, in software. That is, the techniques may be carried out in a computer system or other data processing system in response to its processor or processing system executing sequences of instructions contained in a memory, such as memory 120 or non-volatile memory 130. In various embodiments, hardwired circuitry may be used in combination with the software instructions to implement the present inventions. Thus, the techniques are not limited to any specific combination of hardware circuitry and software or to any particular source for the instructions executed by the data processing system. In addition, throughout this description, various functions and operations are described as being performed by or caused by software code to simplify description. However, what is meant by such expressions is that the functions result from execution of the code by a processing system.

Figure 2:
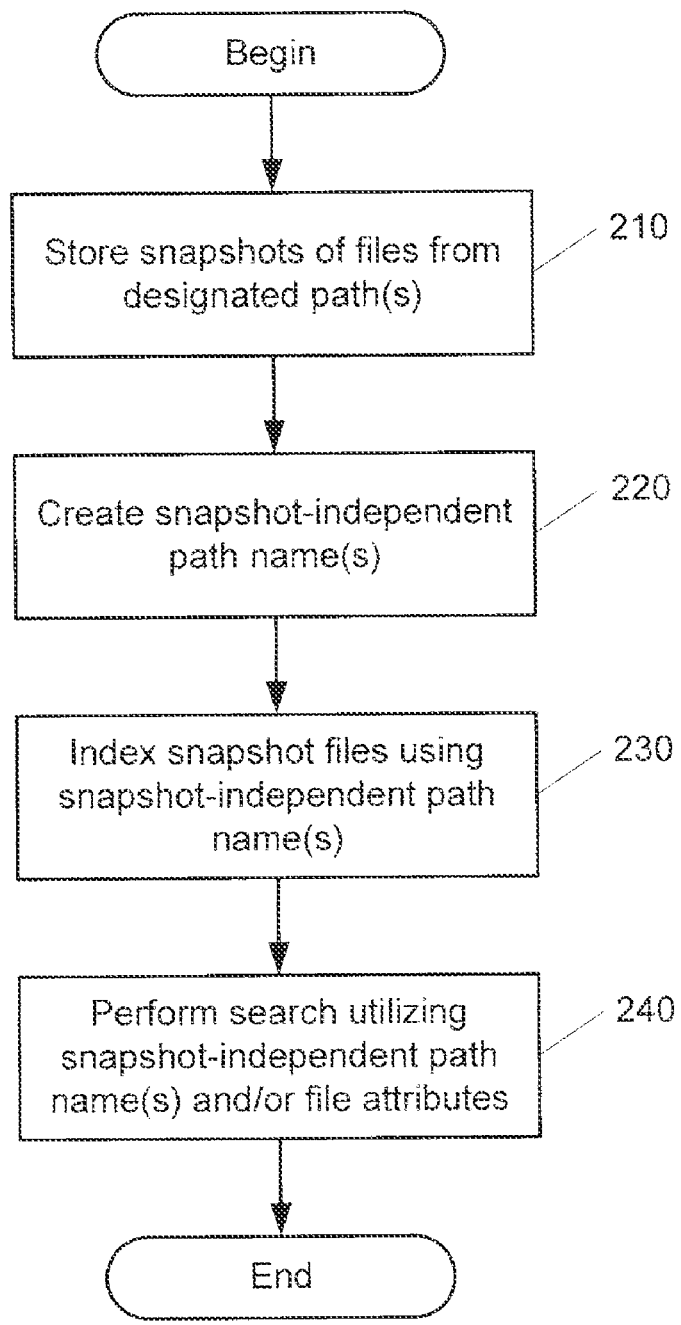
FIG. 2 is a flow diagram of one embodiment of a technique to store and organize snapshot files.

FIG. 2 is a flow diagram of one embodiment of a technique to store and organize snapshot files. In one embodiment, backup copies (or snapshots) of files are created in new hierarchies of files and/or folders for each snapshot. The snapshot files are stored, 210. In one embodiment, the snapshot files are stored on a different storage device than the original files. For example, for original files stored on a first hard drive, corresponding snapshot files may be stored on a second hard drive. Any type of storage medium may be used.

In one embodiment, the snapshot files may be stored utilizing path names that are unique to the snapshot. For example, a portion of the path name may indicate the date and/or time corresponding to creation of the snapshot. For example, an unchanged file for which a snapshot is created each day may result in the following paths to the backup file:
Computer/Data/20070502/User/John/file.xyz
Computer/Data/20070501/User/John/file.xyz
Computer/Data/20070430/User/John/file.xyz
Computer/Data/20070429/User/John/file.xyz.
A corresponding snapshot-independent path to the file may be
Computer/Data/User/John/file.xyz.
The snapshot files may be stored utilizing the snapshot-independent path name(s), 220. In alternate embodiments, different unique snapshot components of the path name may be use as well as different snapshot-independent path names.

In one embodiment, snapshot files are read-only files and indexing is accomplished using the snapshot-independent path name(s), 230. Various indexing approaches may be utilized. For example, in one embodiment, the entire path (Computer/Data/User/John/file.xyz) may be indexed and in another embodiment, a shorter path (Computer/Data/User/John) may be indexed. A shorter path may also be Computer/Data/User/John/, which would allow a normal prefix search to be used for file paths. Otherwise, Computer/Data/User/John would match Computer/Data/User/JohnH. The directory Computer/Data/User/John may or may not be stored with the slash, depending on the desired behavior. In one embodiment, when snapshot files are stored, at least two attributes are associated with the file that indicate the first snapshot the file appears in and the last snapshot the file appears in.

In one embodiment, when a file is modified, the modified file is considered a new file for snapshot purposes. That is, an unchanged file has associated attributes that indicate the time and/or date of creation as well as the time and/or date of modification.

In one embodiment, in order to avoid updating the attributes of snapshot files for the last snapshot for which the file is included, the following modification may be utilized. When the file is first backed up it is assumed to be unchanged for eternity and the attribute for the last snapshot the file belongs to is set to the most recent backup time and/or date. This alleviates the need to update the attribute unless the file ceases to be part of a backup, for example, if the file is deleted. When a file ceases to be part of a backup the attribute is updated to indicate the last snapshot the file was included in.

The use of the attributes and of the snapshot-independent path names allows the determination of all files that have existed in a selected directory. The use of the attributes and of the snapshot-independent path names also allows the determination of all files that existed at a selected time. Thus, a query can be limited to a selected path and/or a selected snapshot without having to resort to resolving the path name from the file system. This results in a more efficient search, 240.

Figure 3:
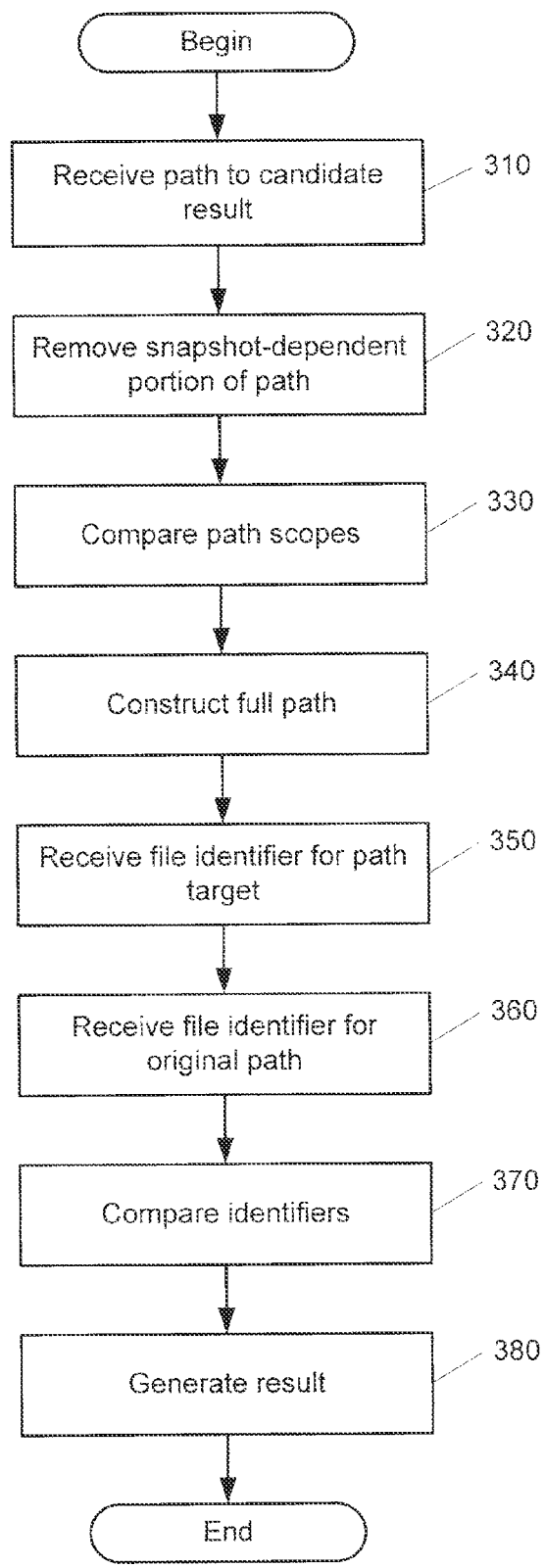
FIG. 3 is a flow diagram of one embodiment of a technique to perform a search within a specified snapshot.

FIG. 3 is a flow diagram of one embodiment of a technique to perform a search within a specified snapshot. With other backup techniques a scoped search would typically require a global volume search and then for each result a check to determine if the result belongs within the scope. This may be further complicated by the use of hardlinks because a file may correspond to multiple paths. Therefore, using the snapshot-independent path name(s) and the attributes described herein, a more efficient search may be performed.

As an example, if a search is to be performed for a selected path (e.g., Computer/Data/Users/John) and limited to a specific date (e.g., April 30), the following technique may be utilized. A path to the candidate result may be received (or determined), 310. Using the example above, the path Computer/Data/20070501/Users/John/file.xyz may be used.

The snapshot-dependent portion of the path name is removed, 320. Continuing with the example above, the path name may be Computer/Data/Users/John/file.xyz The now snapshot-independent path name may be compared to the scope of the original search request, 330, to determine whether the identified file falls within the scope of the search.

The full path is then constructed, 340. For example

Computer/Data/20070430/Users/John/file.xyz

The file identifier for the file designated by the newly constructed path is received, 350. The file identifier for the file designated by the original path is received, 360. In the above example, the original path is Computer/Data/20070501/Users/John/file.xyz The two identifiers are compared, 370. If the two identifiers match the candidate file is a match and within the scope of the search. If the identifiers match, an output signal is generated, 380. The output signal may be used by an application, for example, to indicate to a user of a computer system that a match has been found.

Figure 4:
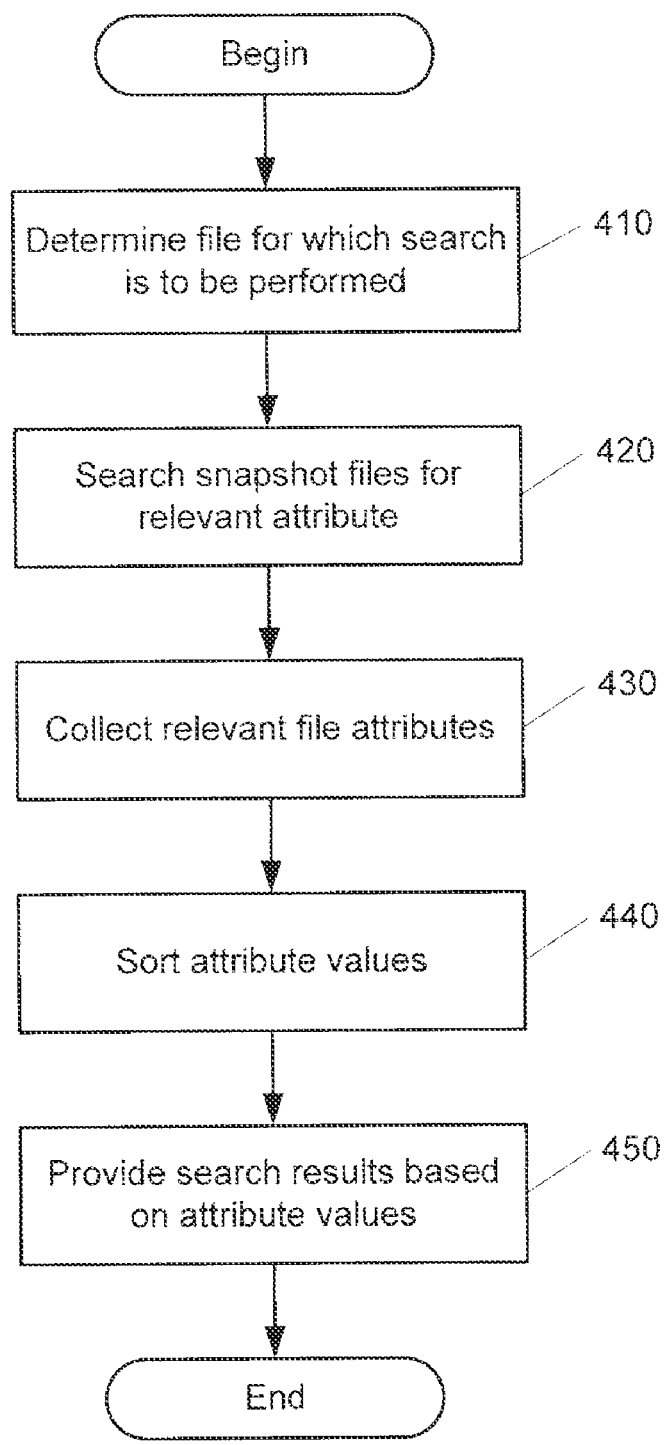
FIG. 4 is a flow diagram of one embodiment of a technique to perform a search for snapshots that correspond to attribute changes.

FIG. 4 is a flow diagram of one embodiment of a technique to perform a search for snapshots that correspond to attribute changes. Any attributes corresponding to a file can be used. These attributes may include, for example, date of changes to the file, path changes, etc.

The file for which a search is to be performed is determined, 410. For example, a user may provide a path name corresponding to the file that is the subject of the search. The snapshot files may be searched for the selected attributes, 420. For example, the attributes for each snapshot for the selected file may be selected. The attribute may indicate when a corresponding file has been modified since the previous snapshot.

The relevant file attributes may be collected, 430. For example, each snapshot may be searched to determine whether a selected file has been modified since the previous snapshot. This may be accomplished by analyzing the attributes associated with the snapshot files. Any type of attributes may be maintained in any manner known in the art. The collected attribute values may be sorted, 440. By sorting the attribute values, the snapshots for which the desired attribute values exist may be more quickly identified. For some attributes, only a binary value is used. For other attributes, a more complex value scale may be used.

Search results may be provided based on the sorted attribute values, 450. For example, if a search is performed for snapshot files for which changes have been made, the sorted attribute results may provide two groups: one corresponding to snapshots for which changes have been made and on corresponding to snapshots for which changes have not been made.

Figure 5:
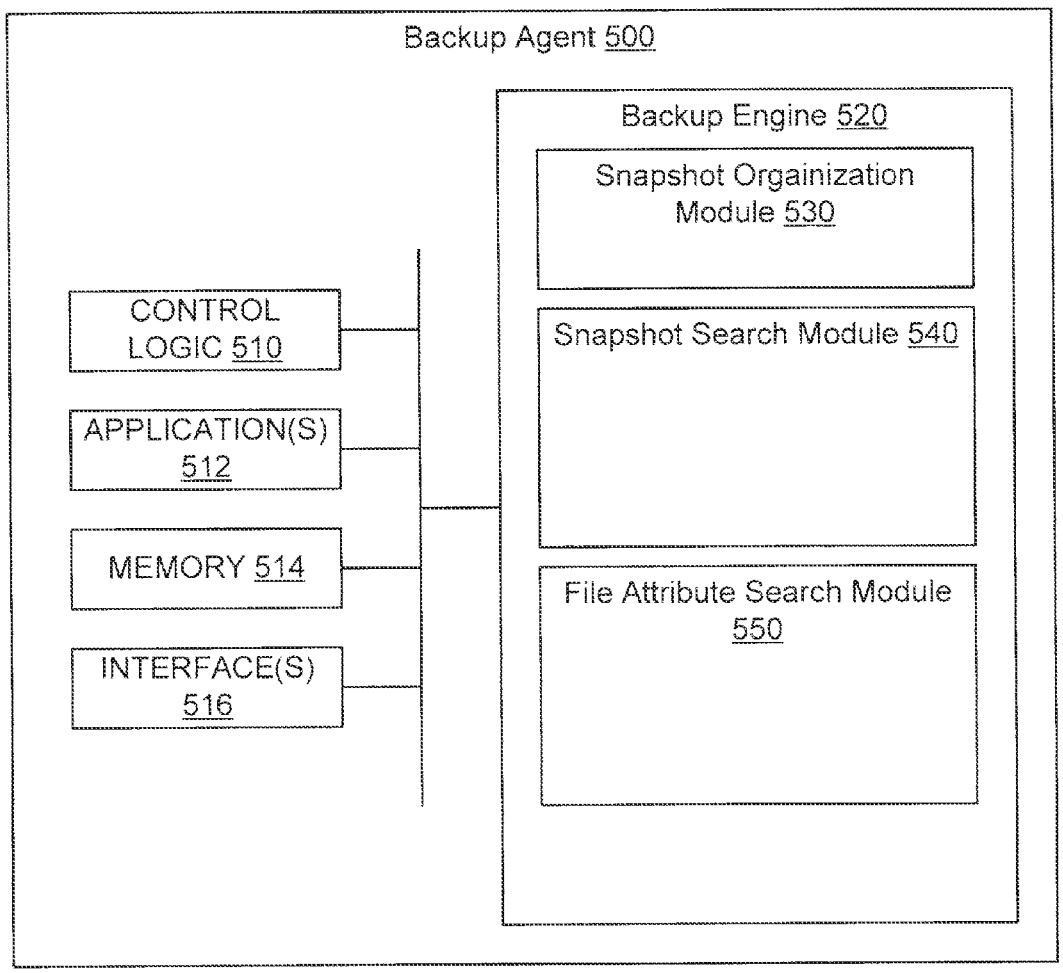
FIG. 5 is a block diagram of one embodiment of a backup agent.

FIG. 5 is a block diagram of one embodiment of a backup agent. Backup agent 500 includes control logic 510, which implements logical functional control to direct operation of backup agent 500, and/or hardware associated with directing operation of backup agent 500. Logic may be hardware logic circuits and/or software routines. In one embodiment, backup agent 500 includes one or more applications 512, which represent code sequence and/or programs that provide instructions to control logic 510.

Backup agent 500 includes memory 514, which represents a memory device and/or access to a memory resource for storing data and/or instructions. Memory 514 may include memory local to backup agent 500, as well as, or alternatively, including memory of the host system on which backup agent 500 resides. Backup agent 500 also includes one or more interfaces 516, which represent access interfaces to/from (an input/output interface) backup agent 500 with regard to entities (electronic or human) external to backup agent 500.

Backup agent 500 also backup engine 520, which represents one or more functions that enable backup agent 500 to store, organize and/or search snapshot files. As discussed above, the snapshot files may be stored on a secondary (e.g., external hard drive) storage device or on a partition of a primary storage device. The example of FIG. 5 provides several modules that may be included in backup engine 520; however, different and/or additional modules may also be included. Example modules that may be involved in storing, organizing and/or searching snapshot files include snapshot organization module 530, snapshot search module 540 and file attribute search module 550. Each of these modules may further include other modules to provide other functions. As used herein, a module refers to routine, a subsystem, etc., whether implemented in hardware, software, or some combination thereof.

Snapshot organization module 530 may provide organization and/or indexing of snapshot files. For example, snapshot organization module 530 may generate snapshot-dependent paths for storage of snapshot files. Further, snapshot organization module 530 may generate snapshot-independent paths as described above. Snapshot organization module 530 may also perform additional functions related to storage and organization of snapshot files.

Snapshot search module 540 may provide search functionality. In one embodiment, the snapshot search may be performed as described with respect to FIGS. 2 and 3. Snapshot search module 540 may, for example, create snapshot-independent path names. Snapshot search engine 540 may also receive and compare file identifiers and/or path names. Snapshot search engine 540 may also provide indexing functionality as described above. Snapshot search engine 540 may also generate an output signal that may be used by, for example, a higher level application to generate an output representation to a user of the application.

File attribute search module 550 may provide search functionality related to attributes associated with corresponding files. In one embodiment, the attribute search may be performed as described with respect to FIGS. 2 and 4. File attribute search module 550 may, for example, search for and collect file attribute values. File attribute search module 550 may also sort the collected file attribute values. File attribute search engine 550 may also generate an output signal that may be used by, for example, a higher level application to generate an output representation to a user of the application.

Additional and/or different modules and functionality may be supported by backup engine 520 and backup agent 500. Any number of modules and search types may be supported by backup engine 520 and backup agent 500.

Figure 6:
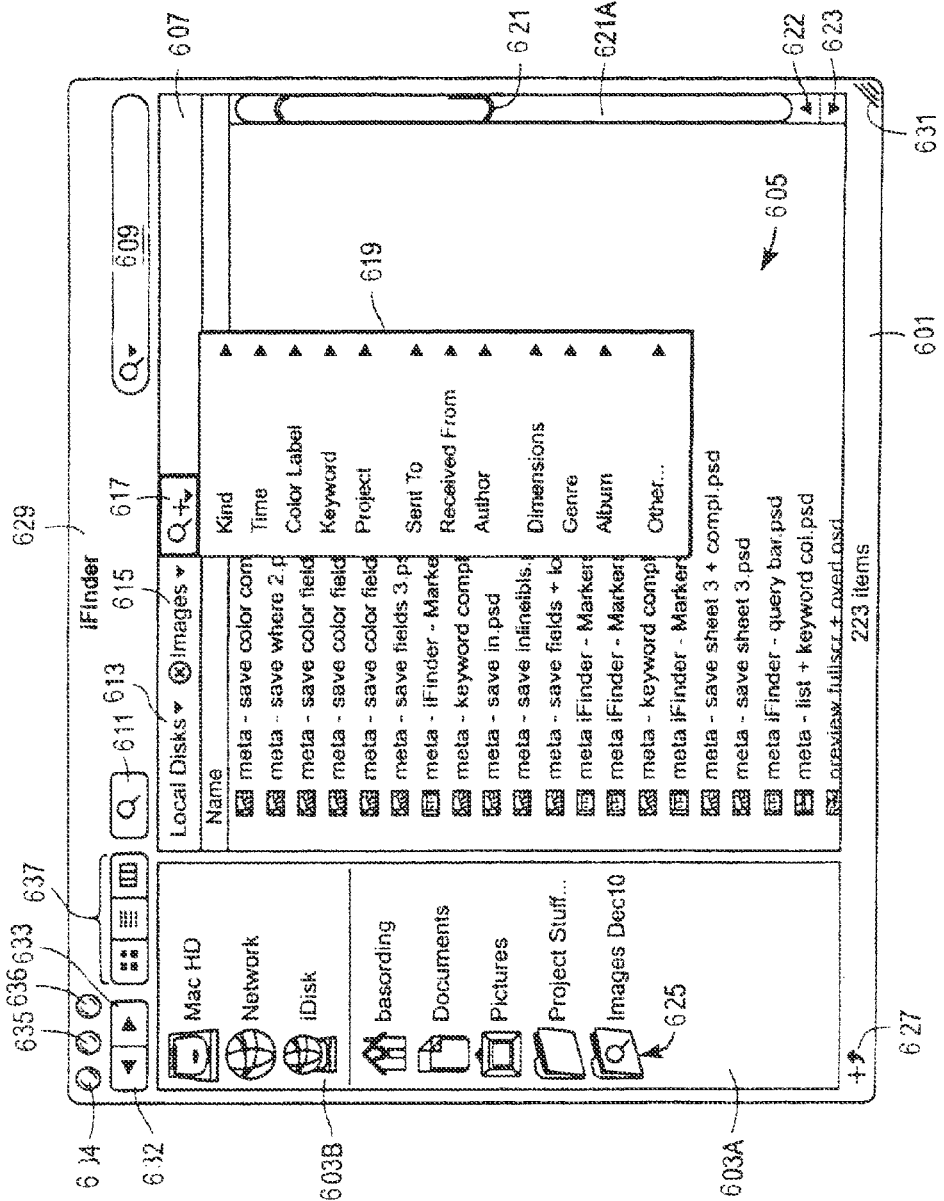
FIG. 6 illustrates a graphical user interface having a window that may be displayed on a display device of a computing device.

FIG. 6 illustrates a graphical user interface having a window that may be displayed on a display device of a computing device. Window 601 includes a side bar having two regions 603A, which is a user configurable region, and 603B, which is a region that is specified by the computing device. Further details in connection with these side bar regions may be found in co-pending U.S. patent application Ser. No. 10/877,584, filed Jun. 21, 2004, and entitled, "Methods and Apparatuses for Operating a Data Processing System," by Donald Lindsay and Bas Ordig.

Window 601 also includes a display region 605 that in this case displays the results of searches requested by a user. Window 601 also includes search parameter menu bar 607 that includes configurable pull down menus 613, 615 and 617. Window 601 also includes text entry region 609 that allows a user to enter text as part of a search query or search parameters.

Button 611 may be a start search button that a user activates in order to start a search based upon the selected search parameters. Alternatively, the system may perform a search as soon as it receives any search parameter inputs or search queries from the user rather than waiting for a command to begin the search. Window 601 also includes title bar 629, which may be used in conjunction with a cursor control device to move, in a conventional manner, the window around a desktop which is displayed on a display device.

Window 601 also includes close button 634, minimize button 635, and resize button 636 which may be used to close, minimize or resize, respectively, window 601. Window 601 also includes resizing control 631 that allows a user to modify the size of the window on a display device. Window 601 further includes back button 632 and forward button 633, which function in a manner which is similar to the back and forward buttons on a web browser, such as Internet Explorer or Safari.

Window 601 also includes view controls that include three buttons for selecting three different types of views of the content within display region 605. When the contents found in a search exceed the available display area of display region 605, scroll controls, such as scroll controls 621, 622 and 623 appear within window 601. These may be use in a conventional manner, for example, by dragging scroll bar 621 within scroll region 621A using conventional graphical user interface techniques.

The combination of text entry region 609 and the search parameter menu bar allow a user to specify a search query or search parameters. Each of the configurable pull down menus presents a user with a list of options to select form when the user activates the pull down menu. As illustrated in FIG. 6 as an example, the user has already mad a selection from configurable pull down menu 613 to specify the location of the search, which in this case specifies that the search will occur on the local disks of the computer system.

Configurable pull down menu 615 has also been used by the user to specify the kind of document to be searched for, which in this case is an image document as indicated by the configurable pull down menu 615 which indicated "images" as the selected configuration of this menu and hence the search parameter which it specifies.

Configurable pull down menu 617, as illustrated in FIG. 6, represents an add search parameter pull down menu. The add search parameter pull down menu allows the user to add additional criteria to the search query to further limit the search results. In the embodiment illustrated in FIG. 6, each of the search parameters is logically ANDed in a Boolean manner. Thus, the current search parameter specified searches all local disks for all images, and the user is in the middle of the process of selecting another search criteria by having selected the add search criteria pull down menu 617, resulting in the display of pull down menu 619, which has a plurality of options which may be selected by the user.

Further details of search techniques and user interfaces may be found in co-pending U.S. patent application Ser. No. 11/499,525 filed Aug. 4, 2006, and entitled, "Methods and Systems for Tracking Document Lineage," by Jonah Petri, Yan Arrouye and Scott Forstall. If one or more documents that satisfy the search criteria are found, the results of the search may be presented to the user. If the search criteria result in no matching documents, it may be because the search criteria were faulty or because a document that met the search criteria was deleted, either intentionally or unintentionally.

Figure 7:
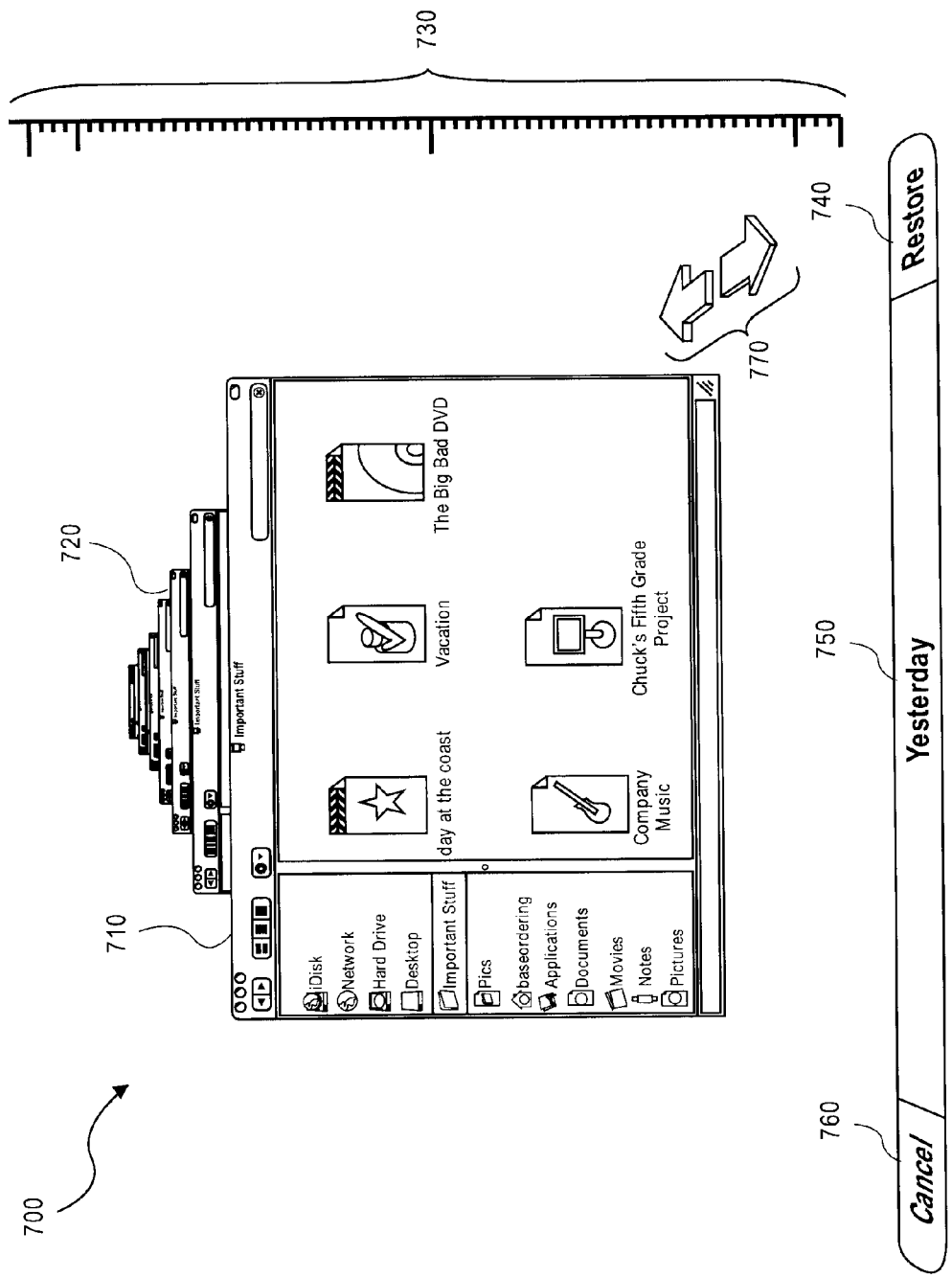
FIG. 7 illustrates a graphical user interface that may be used to facilitate document recovery.

FIG. 7 illustrates a graphical user interface that may be used to facilitate document recovery. If a search does not result in the desired file, a user may access the backup, snapshot files discussed above by selecting an icon, window, menu or other graphical user input device. Alternatively, the user may press a button or provide another type of input to the computer system. In response to the input indicating that the user wishes to restore one or more files, the graphical user interface of FIG. 7 may be presented. In alternate embodiments, other types of interfaces may be utilized.

In one embodiment, screen 700 may include a control bar having cancel button 760 and restore button 740. Cancel button 760 may allow the user to cancel a search of the snapshot files and/or cancel the process of restoring a file. Restore button 740 may allow the user to restore one or more selected files. In response to selecting restore button 740, the selected files may be copied or moved from the snapshot storage hierarchy to an original path corresponding to the file before the file was deleted. In one embodiment, the control bar may include date field 750, which may indicate to the user the date of a selected file.

Window 710 may present snapshot files that meet the search criteria for a particular date as indicated by date field 750. Several windows 720 may be presented behind window 710 to indicate files that meet the search criteria from later in time. Arrow buttons 770, cursor keys and/or other input devices may allow the user to move through time to select the desired file. In one embodiment, timeline 730 may present a range of time and allow the user to scroll through time more quickly than using arrow buttons 770 or cursor keys.

As discussed above, two types of searches may be performed on the snapshot files. Either one or both of the search results may be presented using the graphical user interface illustrated in FIG. 7. When a user selects a file to be restored, the user may select restore button 740.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method comprising:
   storing a new snapshot file on a non-transitory storage medium, the new snapshot file having a corresponding path name, the corresponding path name having a unique portion and a non-unique portion,
   wherein, if a data file is created or modified after a previous most recent snapshot file was stored, the new snapshot file includes a copy of the data file, wherein, if the data file remains unmodified after the previous most recent snapshot file was stored, the new snapshot file includes a link to a most recent snapshot file including a copy of the data file, and wherein each snapshot file includes content associated with only one data file;

creating a snapshot-independent path name for the new snapshot file, the snapshot-independent path name comprising the non-unique portion of the corresponding path name and excluding the unique portion;

generating or updating an entry in an index for the new snapshot file using the snapshot-independent path name;

associating attributes with the data file to indicate a first snapshot file stored for the data file and a last snapshot file stored for the data file;

generating search results for a search within a plurality of snapshot files; and limiting the generated search results to a subset of the snapshot files based on at least one of:
the indexed snapshot-independent path name, and
the attributes associated with the data file.

2. A method as in claim 1 wherein the unique portion of the corresponding path name comprises a date the new snapshot file was stored.

3. A method as in claim 1 wherein the data files are stored on a first storage medium and the snapshot files are stored on a second storage medium.

4. A method as in claim 1, wherein:
the attribute indicating the first snapshot file stored for the data file is a date the first snapshot file was stored; and
the attribute indicating the last snapshot file stored for the data file is a date the last snapshot file was stored.

5. A method as in claim 1 wherein the non-unique portion of the corresponding path name comprises a name of a directory in which the data file is stored.

6. A method as in claim 1, wherein the subset of snapshot files to which the generated search results are limited are snapshot files existing in a directory, the directory's name based on the snapshot-independent path name.

7. A method as in claim 1, wherein the subset of snapshot files to which the generated search results are limited are snapshot files as they existed on a particular date based on the attributes associated with the data file.

8. A method as in claim 1, wherein the subset of snapshot files to which the generated search results are limited is a snapshot file in which the data file last appeared, the method further comprising:
sorting the attributes associated with the data file in order by values of the attributes;
determining which of the snapshot files is the snapshot file in which the data file last appeared based on the attribute having the most recent value; and
limiting generating search results to the snapshot file in which the data file last appeared.

9. An article comprising a non-transitory computer-readable medium having stored thereon instructions that, when executed cause one or more processors to:
store a new snapshot file on a non-transitory storage medium, the new snapshot file having a corresponding path name, the corresponding path name having a unique portion and a non-unique portion,
wherein, if a data file is created or modified after a previous most recent snapshot file was stored, the new snapshot file includes a copy of the data file,
wherein, if the data file remains unmodified after the previous most recent snapshot file was stored, the new snapshot file includes a link to a most recent snapshot file including a copy of the data file, and
wherein each snapshot file includes content associated with only one data file;
create a snapshot-independent path name for the new snapshot file, the snapshot-independent path name comprising the non-unique portion of the corresponding path name and excluding the unique portion;
generating or updating an entry in an index for the new snapshot file using the snapshot-independent path name;
associate attributes with the data file to indicate a first snapshot file stored for the data file and a last snapshot file stored for the data file;
generate search results for a search within a plurality of snapshot files; and
limit the generated search results to a subset of the snapshot files based on at least one of:
the indexed snapshot-independent path name, and
the attributes associated with the data file.

10. An article as in claim 9 wherein the unique portion of the corresponding path name comprises a date the new snapshot file was stored.

11. An article as in claim 9 wherein the data files are stored on a first storage medium and the snapshot files are stored on a second storage medium.

12. An article as in claim 9, wherein:
the attribute indicating the first snapshot file stored for the data file is a date the first snapshot file was stored; and
the attribute indicating the last snapshot file stored for the data file is a date the last snapshot file was stored.

13. An article as in claim 9 wherein the non-unique portion of the corresponding path name comprises a name of a directory in which the data file is stored.

14. An article as in claim 9, wherein the subset of snapshot files to which the generated search results are limited are snapshot files existing in a directory, the directory's name based on the snapshot-independent path name.

15. An article as in claim 9, wherein the subset of snapshot files to which the generated search results are limited are snapshot files as they existed on a particular date based on the attributes associated with the data file.

16. An article as in claim 9, wherein the subset of snapshot files to which the generated search results are limited is a snapshot file in which the data file last appeared, and the instructions, when executed, further cause the one or more processors to:
sort the attributes associated with the data file in order by values of the attributes;
determine which of the snapshot files is the snapshot file in which the data file last appeared based on the attribute having the most recent value; and
limit search results generated for the query against the index to the snapshot file in which the data file last appeared.

17. An apparatus comprising:
means for storing a new snapshot file, the new snapshot file having a corresponding path name, the corresponding path name having a unique portion and a non-unique portion
wherein, if a data file is created or modified after a previous most recent snapshot file was stored, the new snapshot file includes a copy of the data file,
wherein, if the data file remains unmodified after the previous most recent snapshot file was stored, the new snapshot file includes a link to a most recent snapshot file including a copy of the data file, and wherein each snapshot file includes content associated with only one data file;

means for creating a snapshot-independent path name for the new snapshot file, the snapshot-independent path name comprising the non-unique portion of the corresponding path name and excluding the unique portion;

means for generating or updating an entry in an index for the new snapshot file using the snapshot-independent path name;

means for associating attributes with the data file to indicate a first snapshot file stored for the data file and a last snapshot file stored for the data file;

means for generating search results for a search within a plurality of snapshot files; and means for limiting the generated search results based on at least one of:
  the indexed snapshot-independent path name, and
  the attributes associated with the data file.

18. A system comprising:
  one or more input/output devices;
  a processor coupled to receive input from at least one of the input/output devices;
  a non-transitory storage medium having stored thereon an index of snapshot files;
  a backup agent coupled to communicate with the processor,
  the backup agent to cause the processor:
    to store a new snapshot file, the new snapshot file having a corresponding path name, the corresponding path name having a unique portion and a non-unique portion,
      wherein, if a data file is created or modified after a previous most recent snapshot file was stored, the new snapshot file includes a copy of the data file,
      wherein, if the data file remains unmodified after the previous most recent snapshot file was stored, the new snapshot file includes a link to a most recent snapshot file including a copy of the data file, and
      wherein each snapshot file includes content associated with only one data file;
    to create a snapshot-independent path name for the new snapshot file, the snapshot-independent path name comprising the non-unique portion of the corresponding path name and excluding the unique portion;
    to generate or update an entry in the index for the new snapshot file using the snapshot-independent path name;
    to associate attributes with the data file to indicate a first snapshot file stored for the data file and a last snapshot file stored for the data file;
    to generate search results for a search within a plurality of snapshot files; and
    to limit the generated search results to a subset of the snapshot files based on at least one of:
      the indexed snapshot-independent path name, and
      the attributes associated with the data file.

19. A system as in claim 18 wherein the backup agent comprises one or more software routines executed by the processor to cause the search results to be output to at least one of the input/output devices.

20. A system as in claim 18 wherein the backup agent comprises one or more circuits coupled with the processor to cause the search results to be output to at least one of the input/output devices.

21. A system as in claim 18 wherein the backup agent comprises a combination of one or more software routines executed by the processor and one or more circuits coupled with the processor to cause the search results to be output to at least one of the input/output devices.

22. A system as in claim 18 wherein the backup agent comprises a snapshot organization module to cause the snapshot files to be stored, generate the snapshot-independent path names, perform the indexing, and to associate the attributes with the data file.

23. A system as in claim 18 wherein the backup agent comprises a snapshot search module to limit generating the search results for the query again the index to the subset of the snapshot files based on the snapshot-independent path names.

24. A system as in claim 18 wherein the backup agent comprises a file attribute search module to limit the generated search results to the subset of the snapshot files based on the attributes associated with the data file.

25. A system as in claim 18, wherein:
  the attribute indicating the first snapshot file stored for the data file is a date the first snapshot file was stored; and
  the attribute indicating the last snapshot file stored for the data file is a date the last snapshot file was stored.

26. A system as in claim 18 wherein the non-unique portion of the corresponding path name comprises a name of a directory in which the data file is stored.

27. A system as in claim 18, wherein the subset of snapshot files to which the generated search results are limited are snapshot files existing in a directory, the directory's name based on the snapshot-independent path name.

28. A system as in claim 18 wherein the subset of snapshot files to which the generated search results are limited are snapshot files as they existed on a particular date based on the attributes associated with the data file.

29. A system as in claim 18, wherein the subset of snapshot files to which the generated search results are limited is a snapshot file in which the data file last appeared, and further wherein the backup agent further causes the processor to:
  sort the attributes associated with the data file in order by values of the attributes;
  determine which of the snapshot files is the snapshot file in which the data file last appeared based on the attribute having the most recent value; and
  limit search results generated for the query against the index to the snapshot file in which the data file last appeared.

* * * * *